(12) United States Patent  
Felix et al.

(10) Patent No.: US 8,985,289 B2
(45) Date of Patent: Mar. 24, 2015

(54) LOW FRICTION SHEAVE BRACKET

(75) Inventors: Stephen Felix, Cooperstown, PA (US); Douglas Anderson, Cochranton, PA (US); William Jubeck, Seneca, PA (US)

(73) Assignee: Joy MM Delaware, Inc., Wilmington, DE (US)

( * ) Notice: Subject to any disclaimer, the term of this patent is extended or adjusted under 35 U.S.C. 154(b) by 274 days.

(21) Appl. No.: 13/411,001

(22) Filed: Mar. 2, 2012

(65) Prior Publication Data

US 2013/0228386 A1 Sep. 5, 2013

Related U.S. Application Data

(60) Provisional application No. 61/513,858, filed on Aug. 1, 2011.

(51) Int. Cl.
B65H 75/44 (2006.01)
B65H 16/02 (2006.01)

(52) U.S. Cl.
USPC .................................. 191/12.2 R; 242/570

(58) Field of Classification Search
CPC ..... H02G 11/00; H02G 11/006; H02G 11/02; B65H 16/02; B65H 16/08; B65H 75/44; B65H 75/4402; B65H 75/48; B65H 79/00
USPC ...... 191/12 R, 12.2 R, 12.4, 12.2 A; 242/570, 242/390, 390.8, 390.9, 379
See application file for complete search history.

(56) References Cited

U.S. PATENT DOCUMENTS

| | | | |
|---|---|---|---|
| 1,409,807 A | 3/1922 | Wood | |
| 3,854,421 A | 12/1974 | Widiger et al. | |
| 3,990,551 A * | 11/1976 | Jamison et al. | 191/12 R |
| 4,569,489 A * | 2/1986 | Frey et al. | 242/390.1 |
| 4,982,057 A * | 1/1991 | Bartkoski | 191/12 R |
| 5,505,404 A | 4/1996 | Dubreuil | |

(Continued)

FOREIGN PATENT DOCUMENTS

| | | |
|---|---|---|
| DE | 3832048 | 2/1990 |
| GB | 824178 | 11/1959 |
| JP | 07137991 | 5/1995 |

OTHER PUBLICATIONS

First Office Action from the Australian Intellectual Property Office for Application No. 2012209007 dated Mar. 12, 2014 (3 pages).

(Continued)

*Primary Examiner* — R. J. McCarry, Jr.

(74) *Attorney, Agent, or Firm* — Michael Best & Friedrich LLP

(57) ABSTRACT

An electrically powered mining vehicle including a frame rollingly supported on a surface for movement over the surface. An electric motor is coupled to the frame for proving power to the vehicle. A cable is electrically coupled to the electric motor for supplying electricity thereto and a cable management system is coupled to the frame and arranged to receive and payout the cable as the vehicle moves over the surface. A sheave bracket is coupled to the frame and arranged to direct the cable into the cable management system and includes a lower plate arranged substantially horizontally, a plurality of vertical rollers that are coupled to the lower plate and are arranged to guide the cable into the cable management system, and a horizontal roller that is coupled to the lower plate and arranged to elevate the cable above the lower plate.

24 Claims, 3 Drawing Sheets

(56) References Cited

U.S. PATENT DOCUMENTS

| | | |
|---|---|---|
| 5,927,693 A | 7/1999 | Hackl |
| 5,967,496 A | 10/1999 | Ulrich et al. |
| 6,276,625 B1 | 8/2001 | Chee et al. |
| 6,530,537 B2 * | 3/2003 | Hanlon .................. 242/390.8 |
| 6,612,516 B1 | 9/2003 | Haines |
| 6,637,698 B1 | 10/2003 | Huang |
| 7,121,294 B1 | 10/2006 | Pierce |
| 7,506,661 B2 | 3/2009 | Corrigan et al. |
| 7,523,883 B2 | 4/2009 | Cheng |
| 7,669,795 B2 | 3/2010 | Brown |
| 2010/0300826 A1 * | 12/2010 | Peterson et al. ......... 191/12.2 R |

OTHER PUBLICATIONS

Australian Patent Office Action for Application No. 2012209007 dated Aug. 15, 2014 (7 pages).

Third Examination Report from the Australian Intellectual Property Office for Application No. 2012209007 dated Nov. 27, 2014 (6 pages).

* cited by examiner

LOW FRICTION SHEAVE BRACKET

RELATED APPLICATIONS

This application claims the benefit of U.S. Provisional Patent Application No. 61/513,858, filed Aug. 1, 2011, the entire contents of which are hereby incorporated by reference.

FIELD

The present invention relates to mining shuttle cars and, more particularly, to sheave brackets for mining shuttle cars.

SUMMARY

Movable electrical machinery, such as shuttle cars used for carrying mining material in underground mines, have electric motors connected by a cable to a source of power. As the machinery moves backwards, forwards, and around corners, the cable is either wound onto or paid out of a reel. The cable extends from the rear of the shuttle car, and, at times, either runs along the side the shuttle car, when the shuttle car is moving backwards, or extends straight back from the shuttle car, when the shuttle car is moving forward. When the shuttle car moves around corners, the cable runs along the rear of the shuttle car.

Existing sheave brackets allow the trailing cable to drag across a rounded metal edge and then a metal plate of the bracket, which may cause friction on the cable. Existing brackets may also allow for accumulation of dirt and debris carried into the bracket by the cable. Added friction from direct contact with the metal plate and accumulated material leads to increased tension during cable pickup and increased drag during cable payout. Increases in tension and drag can be damaging to the cable jacket, splices in the cable, etc. Over time, this reduces life of and increases maintenance of the cable and may adversely affect other components of the system.

The trailing cable is expensive and a high maintenance component, and, therefore, cable management is an important part of extending the life span of the cable. Trailing cables are often installed in lengths of up to seven-hundred feet, and, if the cable is damaged or torn in two, the cable is often spliced back together. Splices create a bulge in the cable, which may snag under tension thereby adding to the strain on the cable. One snag point in the sheave bracket is on the rounded metal edge as the cable drags across the edge. Further, pulling the cable across the metal plate creates friction, increasing tension and drag. The combination of heat from friction and strain of the cable (e.g., the splices) being snagged greatly reduces the life of the trailing cable.

In independent embodiments, a low friction sheave bracket incorporates the use of bearing rollers arranged horizontally for supporting cable on a rolling surface above the metal plate. The rollers raise the cable off the edge of the sheave plate and allow the cable to run through the bracket without dragging on the metal sheave plate. This may reduce the friction on the cable and allows the splices to pass over the rollers with much less strain, may allow dirt and debris to fall away and reducing the friction on the cable, etc., thereby increasing the life of the trailing cable and improving cable management.

To incorporate the horizontal rollers, the larger sheave wheels found in existing sheave brackets are replaced with smaller vertical bearing rollers. The smaller diameter rollers may also eliminate issues with the larger sheave wheels freezing up and not turning at times, which may add to friction or tension on the cable. The present sheave bracket eliminates much of the tension and drag on the cable and creates a larger opening for cable splices to pass through with much less resistance on the cable and, this, may extend the life of trailing cable on shuttle cars.

In one independent embodiment, a sheave bracket is provided for directing a trailing cable of a mining vehicle, the vehicle including a cable management system. The bracket may generally include a plate, a plurality of first rollers coupled to and extending generally perpendicular to the plate, the first rollers being arranged to guide the cable into the cable management system, and a second roller coupled to the and extending generally parallel to the plate, the second roller being arranged to elevate the cable above the plate.

In another independent embodiment, a sheave bracket may generally include a lower plate, an upper plate spaced from and extending generally parallel to the lower plate, a horizontal roller coupled to the and extending generally parallel to the lower plate, the horizontal roller being arranged to elevate the cable above the lower plate.

In yet another independent embodiment, an electrically powered mining vehicle may generally include a frame supported for movement over the surface, an electric motor coupled to the frame for providing power to the vehicle, a cable electrically coupled to the motor for supplying power to the motor, a cable management system coupled to the frame and arranged to receive and payout the cable as the vehicle moves over the surface, and a sheave bracket coupled to the frame and arranged to direct the cable into the cable management system. The bracket may generally include a lower plate arranged generally horizontally, an upper plate spaced from and arranged generally parallel to the lower plate, a plurality of vertical rollers coupled to and extending between the lower plate and the upper plate, the vertical rollers being arranged to guide the cable into the cable management system, and a horizontal roller coupled to the lower plate and arranged to elevate the cable above the lower plate.

Independent aspects of the invention will become apparent by consideration of the detailed description, claims and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, the terms "connected" and "coupled" are not restricted to physical or mechanical connections or couplings.

Figure 1:
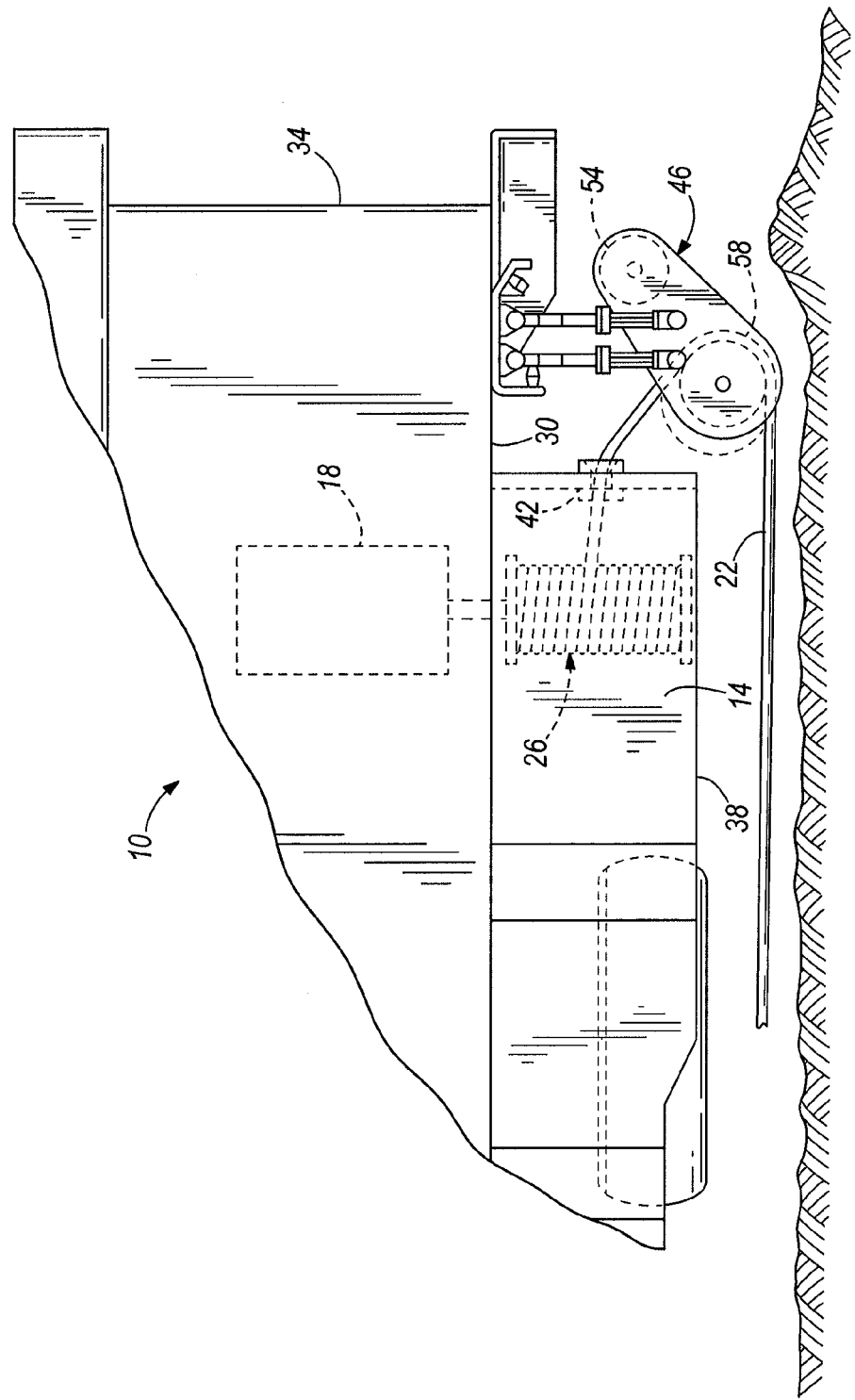
FIG. 1 is a top view of prior art shuttle car and sheave bracket.

An example of a prior art system is shown and described in U.S. Pat. No. 6,530,537, the entire contents of which are hereby incorporated by reference. This system is shown in FIG. 1 of the present application. FIG. 1 illustrates a portion of a shuttle car 10 used to haul material in underground mines. The shuttle car 10 includes a frame 14, an electrical motor 18 supported on the frame 14, and a cable 22 electrically connected to the motor 18 and adapted connect the motor to a source of power (not shown).

The shuttle car 10 further includes a reel 26 providing for storage of the cable 22. The illustrated reel 26 is supported on the frame 14 between the electric motor 18 and one end of the frame 14 (e.g., near the left rear 30 of the shuttle car 10). As the shuttle car 10 moves backwards, forwards, and around corners, the cable 22 is either wound onto or paid out of the reel 26. The cable 22 extends from the rear 34 of the shuttle car 10, and, at times, either runs along the side 38 of the shuttle car 10, when the shuttle car 10 is moving backwards, or extends straight back from the shuttle car 10 (not shown), when the shuttle car 10 is moving forward. When the shuttle car 10 moves around a corner, the cable 22 runs along the rear 34 of the shuttle car 10. In many applications, the cable 22 can be between 500 and 750 feet long.

The shuttle car 10 further includes a spooling device 42 between the reel 26 and the rear 34 of the shuttle car 10, and a sheave bracket assembly 46 mounted proximate the reel 26 (on the left rear 30 of the shuttle car 10). The existing sheave bracket assembly 46 includes an upper mounting plate (shown in FIG. 1), a lower mounting plate (not shown but substantially matching the upper plate), and two spaced apart sheaves 54 and 58 rotatably mounted between the mounting plates. The cable 22 extends from the cable reel 26 through the spooling device 42, and then between the sheaves 54 and 58.

Figure 2:
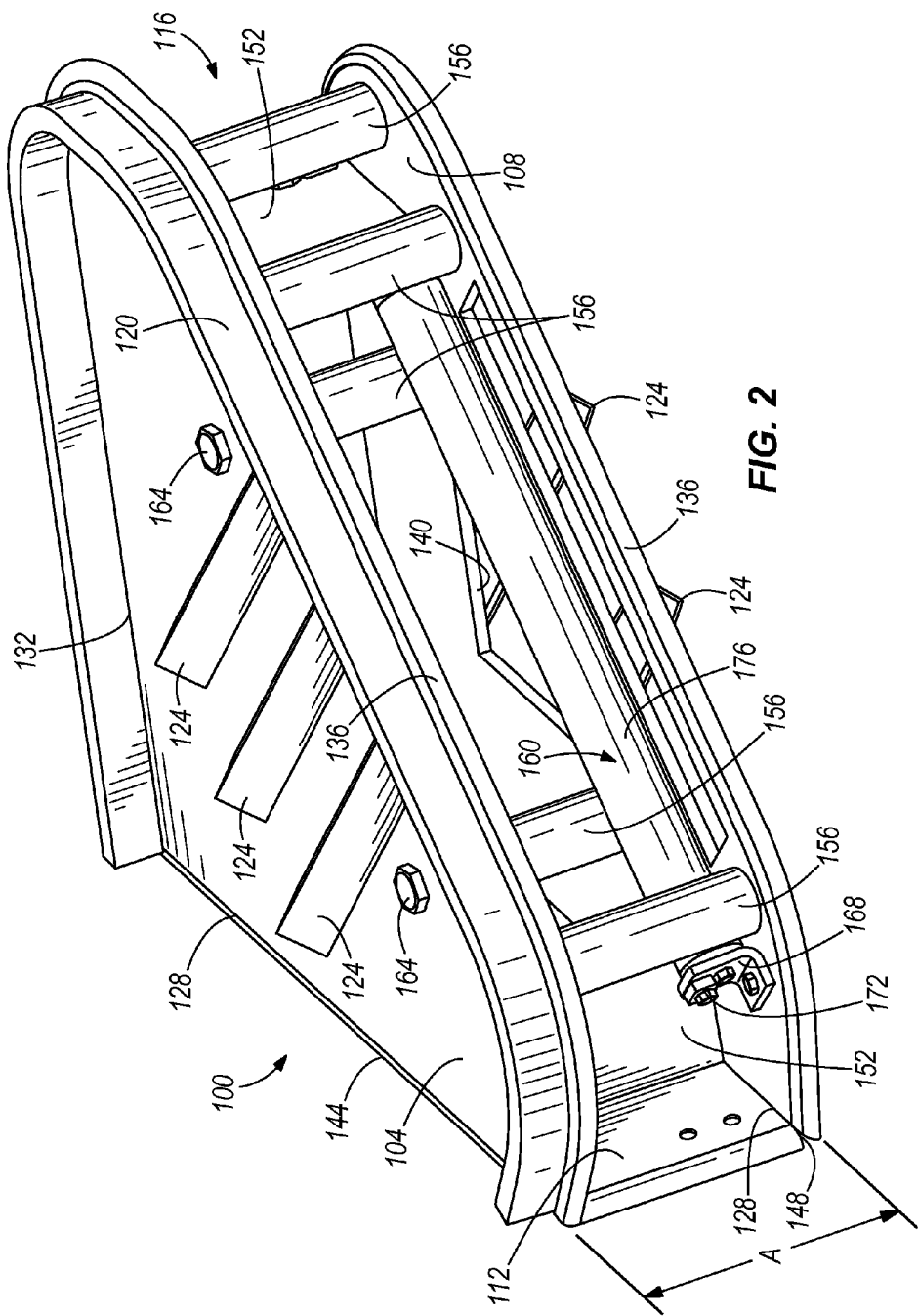
FIG. 2 is a perspective view of a sheave bracket, embodying independent aspects of the present invention.
Figure 3:
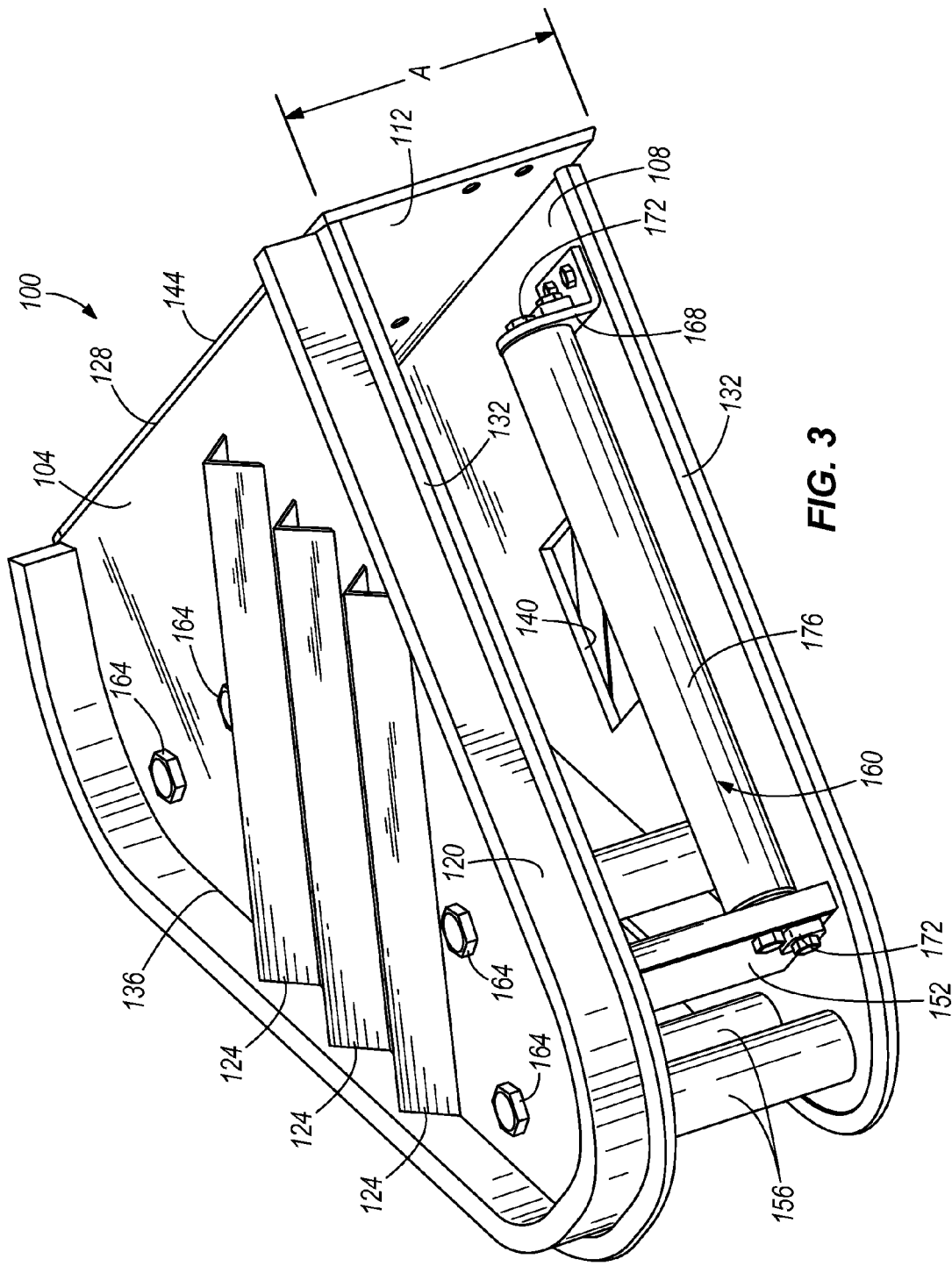
FIG. 3 is another perspective view of the sheave bracket shown in FIG. 2.

FIGS. 2-3 show a low friction sheave bracket 100 embodying independent aspects of the invention. The present bracket 100 replaces the existing bracket assembly 46 on the shuttle car 10. The bracket 100 generally includes an upper plate 104, a lower plate 108, a mounting plate 112, and a roller assembly 116.

The upper plate 104 defines an outer periphery and includes a raised rail 120 and a plurality (e.g., three) ribs 124. The raised rail 120 and the ribs 124 may reinforce and/or limit wear on the upper plate 104. The lower plate 108 defines a periphery mirroring the periphery of the upper plate 104. The lower plate 108 also includes a plurality (e.g., two) ribs 124, which may reinforce and/or reduce the wear on the lower plate 108.

A mounting edge 128 is provided on the upper and lower plates 104, 108 proximate the mounting plate 112. An outlet 132 is arranged generally perpendicular to the mounting edge 128, and an inlet 136 is arranged obliquely to the mounting edge 128 and the outlet 132. An aperture 140 is defined through the lower plate 108 and allows material collected within the bracket 100 to fall, via gravity out, of the bracket 100, thereby reducing the material accumulated therein.

The mounting plate 112 defines a height A between an upper mounting edge 144 and a lower mounting edge 148. The mounting edges 144, 148 of the mounting plate 112 are welded to the mounting edge 128 of the plates 104, 108 such that the plates 104, 108, 112 form a single unit. The upper and lower plates 104, 108 are arranged in a spaced arrangement, separated by the height A of the mounting plate 112. The mounting plate 112 defines apertures arranged to receive fasteners for fastening the bracket 100 to a shuttle car (e.g., the shuttle car 10 shown in FIG. 1). Support bars 152 are welded between the upper and lower plates 104, 108 to add additional support and strength.

The roller assembly 116 includes a plurality (e.g., five) vertical rollers 156 and a plurality (e.g., two) horizontal rollers 160. The vertical rollers 156 each mount to a bolt 164 extending between and fastened to the upper plate 104 and the lower plate 108. Each roller 156 is mounted to the bolt 164 via two bearings (not shown) to allow the vertical roller 156 to spin freely about the bolt 164. Each roller 156 has a length and a diameter, and the length is greater than the diameter. In other words, the vertical rollers 156 are tall and skinny, especially compared to the prior art sheaves 54, 58.

One horizontal roller 160 is arranged adjacent the outlet 132 on the lower plate 108 and another horizontal roller 160 is arranged adjacent the inlet 136 on the lower plate 108. The horizontal rollers 160 are supported between two mounting tabs 168 fastened to the lower plate 108. A bolt 172 passes between and is fastened to the mounting tabs 168. A roller body 176 is mounted on the bolt 172 via a bearing arrangement (not shown) to allow the roller body 176 to spin freely about the bolt 172. Each roller body 176 has a length and a diameter, and the length is greater than the diameter. In other words, the horizontal rollers 160 are long and narrow.

In the illustrated construction, bearings are integrated with the rollers 156, 160 and include roller bearings utilizing ball bearings. In other constructions, separate bearings may be installed and/or may be of a type other than ball bearings (e.g., pin or tapered type bearings, etc.).

During use, as the trailing cable passes through the bracket 100, the cable is rollingly supported on the horizontal rollers 160. The vertical rollers 156 are arranged in place of the sheaves 54, 58 in the prior bracket 46 such that a trailing cable (similar to the cable 22 shown in FIG. 1) contacts and is rollingly supported on the rollers 156 to be moved and directed through the bracket 100 with minimal resistance.

The cable is supported by the horizontal rollers 160 in such a way that there is very little resistance to movement through the bracket 100. The horizontal rollers 160 raise the cable above the lower plate 108 and reduce or eliminate contact between the cable and the edge of the plate 108. The horizontal rollers 160 may also aid in removing dirt, coal, or other material from the cable as the cable passes through the bracket 100. Any such debris which does enter the bracket 100 may fall through the aperture 140 in the lower plate 108.

One or more independent features and advantages of the invention may be set forth in the following claims:

What is claimed is:

1. A sheave bracket for directing a trailing cable of a mining vehicle, the vehicle including a cable management system, the bracket comprising:
   a plate;
   a plurality of first rollers coupled to and extending generally perpendicular to the plate, the first rollers being arranged to guide the cable into the cable management system;
   a second roller coupled to and extending generally parallel to the plate, the second roller extending between one of the plurality of first rollers and another of the plurality of first rollers, the second roller being arranged to elevate the cable above the plate; and
   a plurality of third rollers coupled to and extending generally perpendicular to the plate;

wherein the plurality of first rollers is arranged on a first side of the second roller, and the plurality of third rollers is arranged on a second side of the second roller.

2. The bracket of claim 1, wherein the second roller has one end and an opposite end, and wherein at least one first roller is positioned proximate the one end of the second roller and at least another first roller is positioned proximate the opposite end of the second roller.

3. The bracket of claim 2, wherein more than one first roller is positioned proximate the one end of the second roller and more than one first roller is positioned proximate the opposite end of the second roller.

4. The bracket of claim 1, further comprising a second plate spaced from and extending generally parallel to the first-mentioned plate, the first rollers extending between the first-mentioned plate and the second plate.

5. The bracket of claim 1, wherein each first roller has a length and a diameter, the length being greater than the diameter.

6. The bracket of claim 1, wherein the pluralities of first and third rollers include five rollers.

7. The bracket of claim 1, wherein the bracket defines an inlet and an outlet, and wherein the bracket further comprises another second roller coupled to and extending generally parallel to the plate, one second roller being positioned proximate the inlet, the other second roller being positioned proximate the outlet.

8. The bracket of claim 1, wherein the second roller has a length and a diameter, the length being greater than the diameter.

9. The bracket of claim 1, wherein the plate defines an aperture configured to allow material flow therethrough.

10. The bracket of claim 1, wherein the plate has an outer periphery, and wherein the second roller is positioned within the outer periphery of the plate.

11. A sheave bracket for directing a trailing cable of a mining vehicle, the vehicle including a cable management system, the bracket comprising:
   a lower plate;
   an upper plate spaced from and extending generally parallel to the lower plate; and
   a horizontal roller coupled to and extending generally parallel to the lower plate, the horizontal roller being positioned between the upper and lower plates and being arranged to elevate the cable above the lower plate;
   wherein the lower plate defines an aperture configured to allow material flow therethrough.

12. The bracket of claim 11, wherein the bracket defines an inlet and an outlet, and wherein the bracket further comprises another horizontal roller, one horizontal roller being positioned proximate the inlet, the other horizontal roller being positioned proximate the outlet.

13. The bracket of claim 11, wherein the horizontal roller has a length and a diameter, the length being greater than the diameter.

14. The bracket of claim 11, further comprising a plurality of vertical rollers coupled to and extending between the lower plate and the upper plate, the vertical rollers being arranged to guide the cable into the cable management system.

15. The bracket of claim 14, wherein each vertical roller has a length and a diameter, the length being greater than the diameter.

16. The bracket of claim 14, wherein the horizontal roller has one end and an opposite end, and wherein more than one of the plurality of vertical rollers is positioned proximate the one end of the horizontal roller and more than one of the plurality of vertical rollers is positioned proximate the opposite end of the horizontal roller.

17. The bracket of claim 16, wherein the plurality of vertical rollers includes five vertical rollers.

18. The bracket of claim 14, wherein the horizontal roller extends between one of the plurality of vertical rollers and another of the plurality of vertical rollers.

19. An electrically powered mining vehicle comprising:
   a frame supported for movement over the surface;
   an electric motor coupled to the frame for providing power to the vehicle;
   a cable electrically coupled to the motor for supplying power to the motor;
   a cable management system coupled to the frame and arranged to receive and payout the cable as the vehicle moves over the surface; and
   a sheave bracket coupled to the frame and arranged to direct the cable into the cable management system, the bracket including
      a lower plate arranged generally horizontal,
      an upper plate spaced from and arranged generally parallel to the lower plate, the upper and lower plates defining an inlet and an outlet, the outlet being located closer to the cable management system than the inlet,
      a plurality of vertical rollers coupled to and extending between the lower plate and the upper plate, the vertical rollers being arranged to guide the cable into the cable management system,
      a first horizontal roller coupled to the lower plate proximate the inlet and arranged to elevate the cable above the lower plate, and
      a second horizontal roller coupled to the lower plate proximate the outlet.

20. The vehicle of claim 19, wherein the cable management system includes a reel arranged to receive the cable.

21. The vehicle of claim 19, wherein the bracket is rigidly mounted to the frame.

22. The vehicle of claim 19, wherein the first horizontal roller has one end and an opposite end, and wherein more than one of the plurality of vertical rollers is positioned proximate the one end of the first horizontal roller and more than one of the plurality of vertical rollers is positioned proximate the opposite end of the first horizontal roller.

23. The vehicle of claim 19, wherein the horizontal roller is positioned between the upper and lower plates.

24. The vehicle of claim 19, wherein the horizontal roller extends between one of the plurality of vertical rollers and another of the plurality of vertical rollers.

* * * * *